(12) United States Patent
Saito

(10) Patent No.: US 8,619,162 B2
(45) Date of Patent: Dec. 31, 2013

(54) IMAGE PROCESSING APPARATUS AND METHOD, AND IMAGE PROCESSING PROGRAM

(75) Inventor: Taro Saito, Saitama (JP)

(73) Assignee: FUJIFILM Corporation, Tokyo (JP)

(*) Notice: Subject to any disclaimer, the term of this patent is extended or adjusted under 35 U.S.C. 154(b) by 308 days.

(21) Appl. No.: 13/011,154

(22) Filed: Jan. 21, 2011

(65) Prior Publication Data

US 2011/0234858 A1 Sep. 29, 2011

(30) Foreign Application Priority Data

Mar. 26, 2010 (JP) ................. 2010-071827

(51) Int. Cl.
*H04N 9/73* (2006.01)
*H04N 5/217* (2011.01)
*G06K 9/00* (2006.01)

(52) U.S. Cl.
USPC .......... 348/241; 348/223.1; 382/167

(58) Field of Classification Search
USPC .......... 348/223.1, 241; 382/162, 167
See application file for complete search history.

(56) References Cited

U.S. PATENT DOCUMENTS

2009/0268051 A1* 10/2009 Utsugi ............. 348/223.1

FOREIGN PATENT DOCUMENTS

| JP | 2002-262299 A | 9/2002 |
| JP | 2006-135745 A | 5/2006 |
| JP | 2009-268033 A | 11/2009 |

* cited by examiner

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

Whether a pixel of interest contained in applied image data exhibits color bleed (a false color or purple fringe) is determined. If the pixel of interest is determined to exhibit color bleed, a direction along which luminance is monotonically decreasing in the vicinity of the pixel of interest is discriminated using the pixel of interest as a starting point. A search is performed in the direction of monotonically decreasing luminance to find a pixel where the monotonic decrease in luminance ends. The found pixel where the monotonic decrease in luminance ends is decided upon as a target pixel and a correction value for causing the color of the pixel of interest to match the color of the target pixel is calculated. The color of the pixel of interest is corrected using the calculated color correction value.

10 Claims, 16 Drawing Sheets

Fig. 11
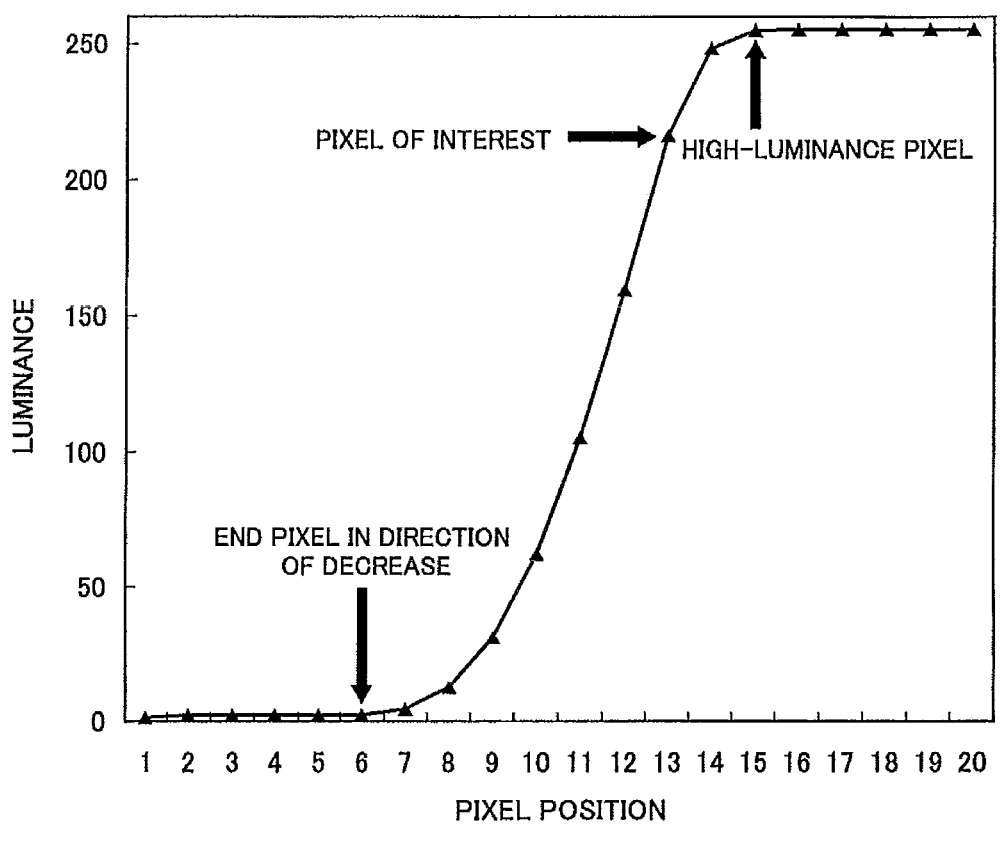

Fig. 13A

DISTANCE TO END PIXEL IN DIRECTION :     3pel → 2pt
OF DECREASE (LEFT)
DISTANCE TO END PIXEL IN DIRECTION :     5pel → 2pt
OF INCREASE (RIGHT)

TOTAL   4pt

Fig. 13B

DISTANCE TO END PIXEL IN DIRECTION :     6pel → 2pt
OF DECREASE (UPPER LEFT)
DISTANCE TO HIGH-LUMINANCE PIXEL :     1pel → 1pt
(LOWER RIGHT)

TOTAL   3pt

Fig. 13C

DISTANCE TO END PIXEL IN DIRECTION :     9pel → 1pt
OF DECREASE (LOWER LEFT)
DISTANCE TO END PIXEL IN DIRECTION :     2pel → 2pt
OF INCREASE (UPPER RIGHT)

TOTAL   3pt

*Fig. 16A*

| DISTANCE TO END PIXEL IN DIRECTION : OF DECREASE (LEFT) | 3pel | → | 2pt |
| DISTANCE TO END PIXEL IN DIRECTION : OF INCREASE (RIGHT) | 5pel | → | 2pt |

TOTAL  4pt

*Fig. 16B*

| DISTANCE TO END PIXEL IN DIRECTION : OF DECREASE (UPPER LEFT) | 6pel | → | 2pt |
| DISTANCE TO HIGH-LUMINANCE PIXEL : (LOWER RIGHT) | 1pel | → | 1pt |
| ADDITION BASED UPON DIRECTIONS OF TARGET : PIXELS IN PROCESSED NEIGHBORING PIXELS | | | 2pt |

TOTAL  5pt

*Fig. 16C*

| DISTANCE TO END PIXEL IN DIRECTION : OF DECREASE (LOWER LEFT) | 9pel | → | 1pt |
| DISTANCE TO END PIXEL IN DIRECTION : OF INCREASE (UPPER RIGHT) | 2pel | → | 2pt |

TOTAL  3pt

US 8,619,162 B2

IMAGE PROCESSING APPARATUS AND METHOD, AND IMAGE PROCESSING PROGRAM

BACKGROUND OF THE INVENTION

1. Field of the Invention

This invention relates to an image processing apparatus and method as well as an image processing program.

2. Description of the Related Art

There are instances where color bleeding (a purple fringe) is visually recognized in an image obtained by imaging using a digital still camera or the like. If an edge having a large difference in luminance (luminance gradient) is present in a capture imaged owing imaging of a high-luminance subject (e.g., a light source), color bleeding readily occurs at the periphery of the image edge.

According to the specification of Japanese Patent Application Laid-Open No. 2009-268033, an area in which the signal level increases or decreases monotonically is discriminated as a color bleed area and a color bleed correction is applied in accordance with amount of change in color in areas other than the color bleed area. Since all areas in which the signal level increases or decreases monotonically are subjected to a color correction, erroneous corrections readily occur. In addition, since a color selected irrespective of the color of the object is corrected, there is a possibility that an unnatural color correction will result.

The specification of Japanese Patent Application Laid-Open No. 2006-135745 describes that purple fringing becomes less conspicuous by lowering saturation. The color of a purple fringe remains the purple color. Further, if saturation is reduced partially, color continuity becomes unnatural.

According to the specification of Japanese Patent Application Laid-Open No. 2002-262299, a region in which the detection value of an edge detection filter is greater than a prescribed value is adopted as a high-luminance region and Cr, Cb signals are averaged to thereby reduce false colors. In order to correct purple fringing occurring over a wide range, filter size must be enlarged, in which case there is the danger than erroneous determinations may be made.

SUMMARY OF THE INVENTION

An object of the present invention is to eliminate color bleeding by color-correcting the color of color-bleed pixels to the color of surrounding pixels.

A further object of the present invention is to implement a color correction featuring natural color continuity.

An image processing apparatus according to the present invention comprises: an image input device (means) for accepting input of applied image data; a color bleed determining device (means) for determining whether a pixel of interest in the image data exhibits color bleed; a luminance monotonic decrease direction discriminating device (means) for discriminating, in a case where the color bleed determining device has determined that the pixel of interest exhibits color bleed, a direction in which luminance is monotonically decreasing, using the pixel of interest as a starting point, in the neighborhood of the pixel of interest; a luminance monotonic decrease end pixel search device (means) for finding a pixel, at which the monotonic decrease in luminance ends, in the direction in which luminance is monotonically decreasing discriminated by the luminance monotonic decrease direction discriminating device; a target pixel deciding device (means) for deciding upon the luminance monotonic decrease end pixel, which has been found by the luminance monotonic decrease end pixel search device, as a target pixel; a color correction value calculating device for calculating a correction value that causes color of the pixel of interest to match the color of the target pixel decided by the target pixel deciding device; and a color correcting device (means) for correcting the color of the pixel of interest using the color correction value calculated by the color correction value calculating device.

The present invention also provides a method suitable for controlling the above-described image processing apparatus. Specifically, the method comprises the steps of: accepting input of applied image data; determining whether a pixel of interest in the image data exhibits color bleed; discriminating, in a case where it has been determined that the pixel of interest exhibits color bleed, a direction in which luminance is monotonically decreasing, using the pixel of interest as a starting point, in the neighborhood of the pixel of interest; finding a pixel, at which the monotonic decrease in luminance ends, in the discriminated direction in which luminance is monotonically decreasing; deciding upon the found luminance monotonic decrease end pixel as a target pixel; calculating a correction value that causes color of the pixel of interest to match the color of the target pixel decided; and correcting the color of the pixel of interest using the color correction value calculated.

The present invention also provides a recording medium on which has been recorded a program for causing a computer to function as the above-described image processing apparatus.

In accordance with the present invention, the direction in which luminance is monotonically deceasing is discriminated using as a starting point a pixel of interest (referred to as a "color-bleed pixel" below) that has been determined to exhibit color bleed (a false color or purple fringe), and a pixel, which exists along this direction, at which the monotonic decrease in luminance ends is decided upon as a target pixel. A color correction value for making the color of the pixel of interest match the color of the decided target pixel is calculated and the color of the pixel of interest determined to exhibit color bleed is corrected using the calculated color correction value. Since a color-bleed pixel is corrected to the color of a pixel having a luminance lower than that of the purple fringe pixel, bleeding of color can be reduced.

Preferably, the apparatus further comprises a distance calculating device (means) for calculating, in a case where a plurality of directions of luminance monotonic decrease have been discriminated by the luminance monotonic decrease direction discriminating device, distances between the pixel of interest and a plurality of luminance monotonic decrease end pixels found in every direction of luminance monotonic decrease by the luminance monotonic decrease end pixel search device. The target pixel deciding device decides, in accordance with the distances calculated by said distance calculating device, that a luminance monotonic decrease end pixel closest to the pixel of interest is the target pixel from among the plurality of luminance monotonic decrease end pixels found by the luminance monotonic decrease end pixel search device. Since a pixel, closest to the position of the pixel of interest, at which the monotonic decrease in luminance ends is decided upon as the target pixel, an unnatural color correction does not readily occur and a natural color correction can be implemented.

In an embodiment, the image processing apparatus is further provided with a noise reducing device (means) for subjecting the image data to noise reduction processing. Since the effects of noise are reduced, the accuracy of the result of discriminating the direction of luminance monotonic decrease by the luminance monotonic decrease direction discriminating device can be improved.

In another embodiment, the apparatus further comprises a luminance monotonic increase discriminating device (means) for discriminating whether luminance is monotonically increasing, using the pixel of interest as a starting point, in an opposite direction relative to the direction in which luminance is monotonically decreasing discriminated by the luminance monotonic decrease direction discriminating device. In a case where luminance has been discriminated to be monotonically increasing in the opposite direction by the luminance monotonic increase discriminating device, the luminance monotonic decrease end pixel search device finds a luminance monotonic decrease end pixel in the direction in which luminance is monotonically decreasing.

Among the types of color bleeding, purple fringing occurs at the periphery of an image outline where there is a large difference in luminance (a large luminance gradient). Accordingly, if one direction from a color-bleed pixel (the pixel of interest) is the direction of a monotonic decrease in luminance, then the opposite direction is that of a monotonic increase in luminance. If luminance is discriminated to be monotonically increasing in this opposite direction, then the target pixel is decided by proceeding with a search for the pixel, at which the monotonic decrease in luminance ends, in the direction of the monotonic decrease in luminance. This makes it possible to prevent an erroneous correction.

Naturally, in a case where the luminance of the pixel of interest itself is high, there is a possibility that the luminance monotonic increase discriminating device will discriminate that luminance is not monotonically increasing in the opposite direction. Accordingly, in another embodiment, the apparatus further comprises a high-luminance pixel detecting device (means) for detecting, in a case where luminance is discriminated not to be monotonically increasing in the opposite direction by the luminance monotonic increase discriminating device, whether a high-luminance pixel having a luminance higher than that of the pixel of interest exists in the opposite direction. If, in a case where the high-luminance pixel detecting device has determined that a high-luminance pixel having a luminance higher than that of the pixel of interest exists in the opposite direction, luminance is discriminated not to be monotonically increasing in the opposite direction by the luminance monotonic increase discriminating device, then the luminance monotonic decrease end pixel search device finds a luminance monotonic decrease end pixel in the direction in which luminance is monotonically decreasing. Thus, even in a case where luminance is not monotonically increasing in the opposite direction, if a high-resolution pixel exists in the opposite direction, then the target pixel is decided by proceeding with a search for the pixel, at which the monotonic decrease in luminance ends, in the direction of the monotonic decrease in luminance.

Preferably the apparatus further comprises: a luminance monotonic increase end pixel search device (means) for finding a pixel, at which the monotonic increase in luminance ends, in the direction in which luminance is monotonically increasing; and a correction value adjusting device (means) for adjusting the color correction value, which has been calculated by the color correction value calculating device, in accordance with distance from the pixel of interest to the luminance monotonic decrease end pixel and distance from the pixel of interest to the luminance monotonic increase end pixel. The color correcting device corrects the color of the pixel of interest using the color correction value adjusted by the correction value adjusting device. For example, the color correction value is adjusted in such a manner that the closer the pixel of interest is to the pixel where the monotonic increase in luminance ends, the more the correcting effect of the correction value is strengthened. Conversely, in a case where the pixel of interest is close to the pixel where the monotonic decrease in luminance ends, the color correction value is adjusted so as to weaken the correcting effect. This makes it possible for the color correction to be applied to color bleed more smoothly.

The situation is similar in a case where the existence of the high-luminance pixel is determined and not a pixel where a monotonic increase in luminance ends. In this case, the apparatus is provided with a correction value adjusting device (means) for adjusting the color correction value, which has been calculated by the color correction value calculating device, in accordance with distance from the pixel of interest to the luminance monotonic decrease end pixel and distance from the pixel of interest to the high-luminance pixel. The color correcting device corrects the color of the pixel of interest using the color correction value adjusted by the correction value adjusting device.

In another embodiment, the apparatus further comprises: a luminance monotonic increase end pixel search device (means) for finding a pixel, at which a monotonic increase in luminance ends, using the pixel of interest as a starting point, in an opposite direction relative to the direction in which luminance is monotonically decreasing discriminated by the luminance monotonic decrease direction discriminating device; a high-luminance pixel search device (means) for finding, in a case where luminance is not monotonically increasing in the opposite direction, a high-luminance pixel having a luminance higher than that of the pixel of interest in the opposite direction; and a distance calculating device (means) which, in a case where a plurality of directions of luminance monotonic decrease have been discriminated by the luminance monotonic decrease direction discriminating device and, moreover, opposite directions relative to the plurality of directions of luminance monotonic decrease are directions of luminance monotonic increase, or high-luminance pixels exist in the opposite directions, is for calculating distances between the pixel of interest and a plurality of luminance monotonic decrease end pixels, and distances between the pixel of interest and a plurality of luminance monotonic increase end pixels or the high-luminance pixels. On the basis of evaluation values calculated in accordance with the distances between the pixel of interest and the luminance monotonic decrease end pixels and the distances between the pixel of interest and the luminance monotonic increase end pixels or the high-luminance pixels, which have been calculated by the distance calculating device, the target pixel deciding device decides, in accordance with a set, for which the evaluation value is largest, composed of a direction of luminance monotonic decrease and a direction of luminance monotonic increase or high-luminance pixel, upon a luminance monotonic decrease end pixel in this luminance monotonic decrease direction as the target pixel. Errors in deciding the target pixel can be reduced.

Preferably, the apparatus further comprises a direction data storage device (means) for storing data, which represents a direction from the pixel of interest toward the target pixel decided by the target pixel deciding device, for every pixel of interest. The target pixel deciding device adds an evaluation value, which is in accordance with data stored in the direction data storage device representing direction toward a target pixel regarding a processed pixel neighboring the pixel of interest, to the evaluation value that is based upon the above-mentioned distances. Erroneous discrimination due to the existence of noise or the like can be reduced.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a graph representing luminance of a plurality of pixels, inclusive of a pixel of interest, arranged on a straight line along a direction of monotonic decrease and a direction of monotonic increase;

FIGS. 13A, B and C illustrate examples of calculation of evaluation values and total evaluation values;

FIGS. 16A, B and C illustrate examples of calculation of evaluation values and total evaluation values.

DESCRIPTION OF THE PREFERRED EMBODIMENTS

Preferred embodiments of the present invention will now be described in detail with reference to the drawings.

Figure 1:
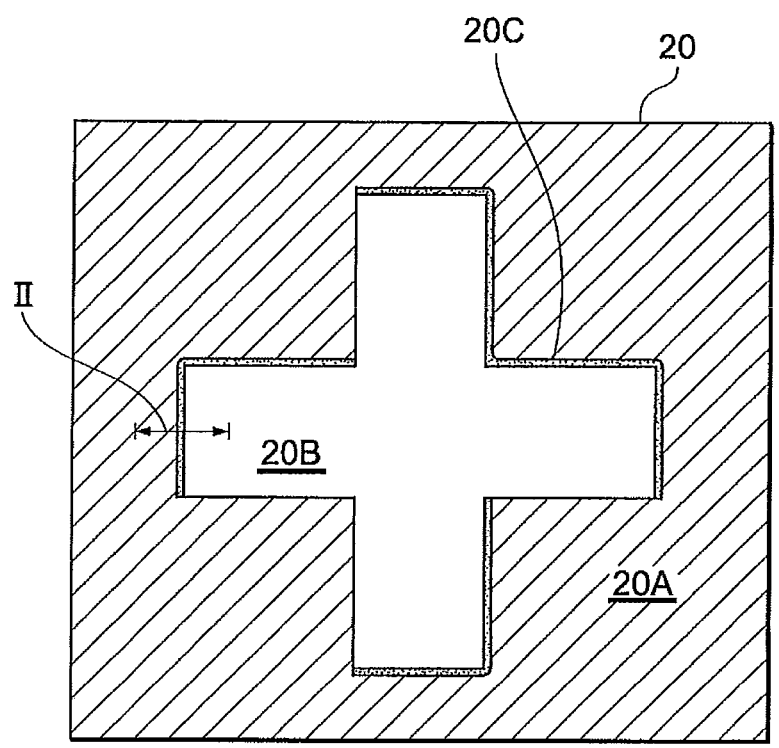
FIG. 1 illustrates an image in which a color bleed (false color or purple fringe) phenomenon has occurred.
Figure 2:
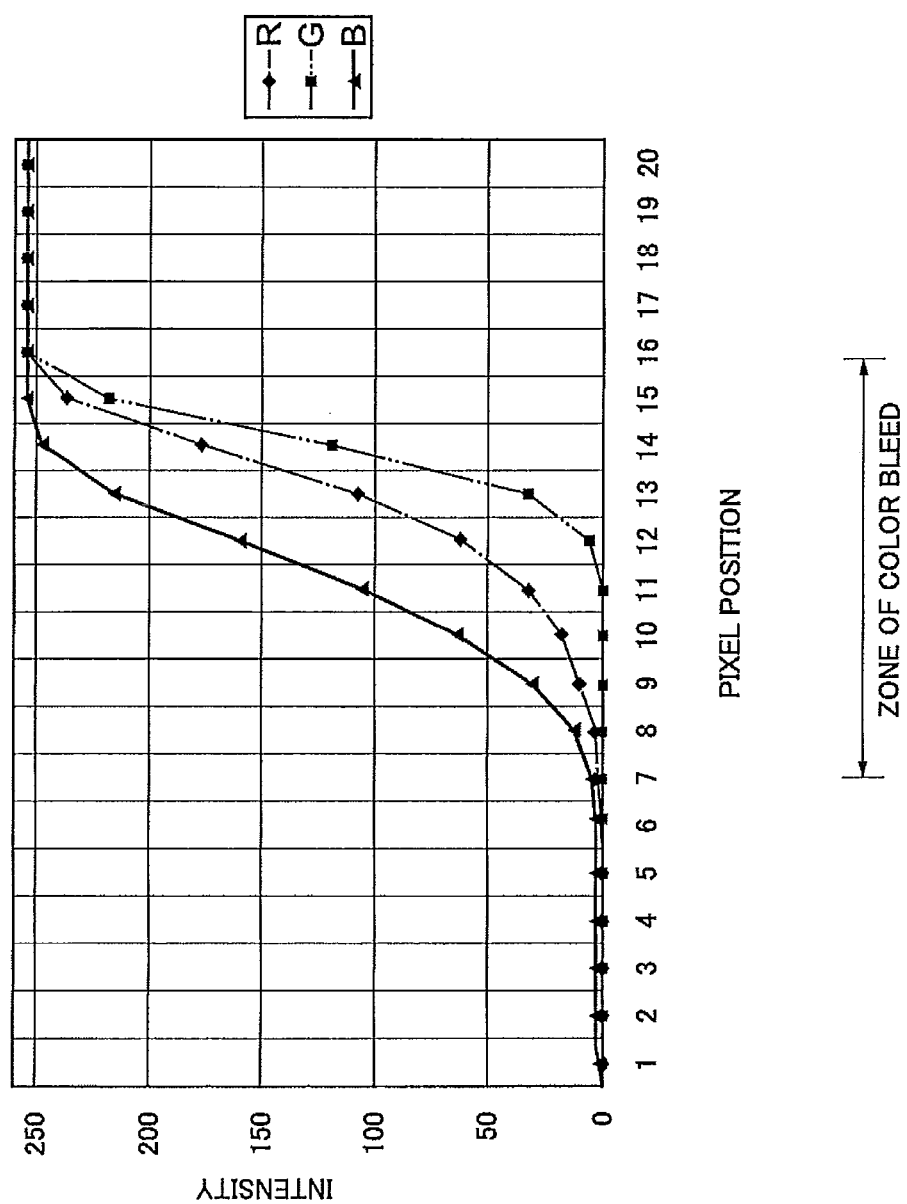
FIG. 2 is a graph representing the intensity (amount of signal) of each of R, G, B components.

FIG. 1 illustrates an image 20 in which a color bleed (false color or purple fringe) phenomenon has occurred, and FIG. 2 is a graph representing the intensity (amount of signal) of each of R, G, B components over a range indicated by II in FIG. 1.

When a high-luminance subject (e.g., a light source) is imaged, there are instances where the periphery of the image edge bleeds into a purple color. Such bleeding into a purple color readily occurs at edge portions of an image where a difference in luminance is large. This purple-color bleed phenomenon is referred to as "purple fringing" in particular. The image 20 shown in FIG. 1 has a black image portion (low-luminance image portion) 20A of low luminance, and a white cross-pattern image portion (high-luminance portion) 20B of high luminance. A purple fringe 20C appears at the edge portions of the cross pattern.

In the zone of color bleed (purple fringe) in FIG. 2, the graph of the green (G) component indicates a sharp change in intensity. The changes in intensity indicated by the graphs of the blue (B) and red (R) components are not sharp in comparison with the green (G) component (the slopes thereof are gentler). As a consequence, a purple fringe is visually recognized.

The image processing apparatus according to the embodiments of the present invention subjects an image in which color bleed (false color, purple fringe) has occurred to image processing for correcting (reducing) this color bleed. This image processing apparatus having a color bleed correction function will be described below.

First Embodiment

Figure 3:
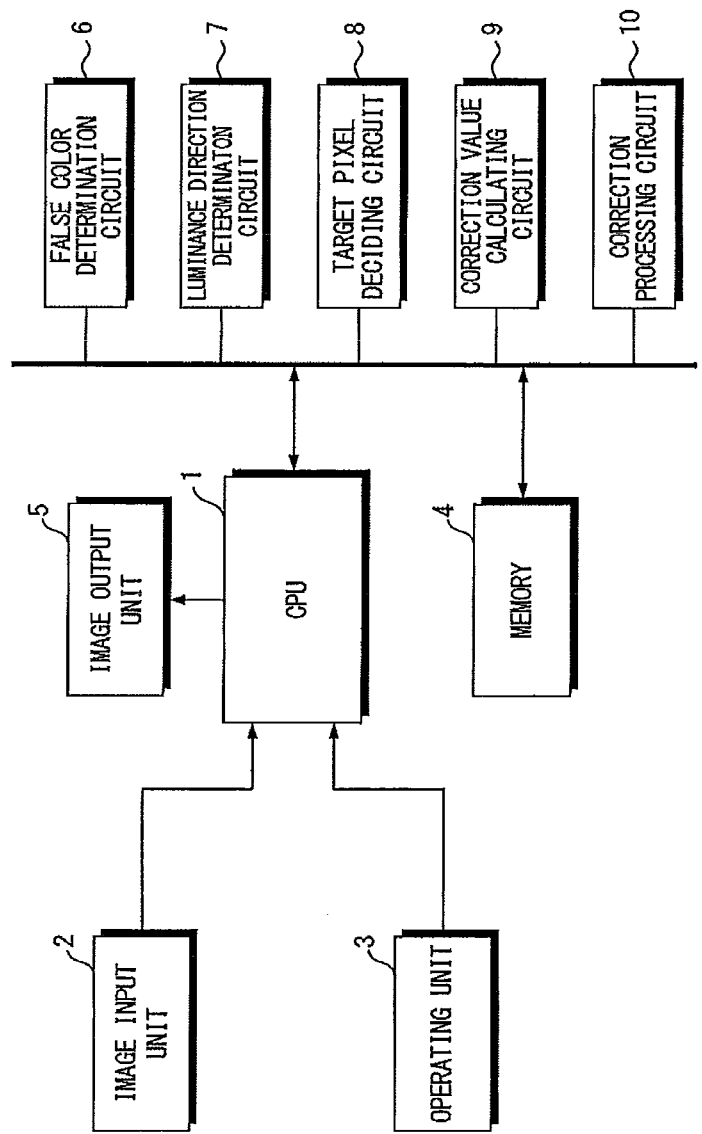
FIG. 3 is a block diagram illustrating the electrical configuration of an image processing apparatus.

FIG. 3 is a block diagram illustrating the electrical configuration of an image processing apparatus according to a first embodiment.

The image processing apparatus has a CPU 1 for controlling the overall operation of the image processing apparatus. Connected to the CPU 1 are an image input unit (a reading unit for reading image data that has been recorded on a memory card, an image data receiving unit for receiving image data transmitted via a network, etc.) 2 for inputting image data to be processed, an operating unit 3 for performing various settings, etc., an image output unit (a display unit, a printer, a recording unit for recording image data on the memory card, etc.) 5 for outputting images represented by image data before image processing and after image processing.

Further connected to the CPU 1 via a data bus is a memory 4 for supplying a work area and buffer area and storing various settings data and a program. Image data processed by the image processing apparatus is stored in the memory 4 temporarily.

Further connected to the data bus are a plurality of hardware devices for color bleed correction, these being a false color determination circuit 6, a luminance direction determination circuit 7, a target pixel deciding circuit 8, a correction value calculating circuit 9 and a correction processing circuit 10. Processing for correcting color bleed is executed by these circuits.

Figure 4:
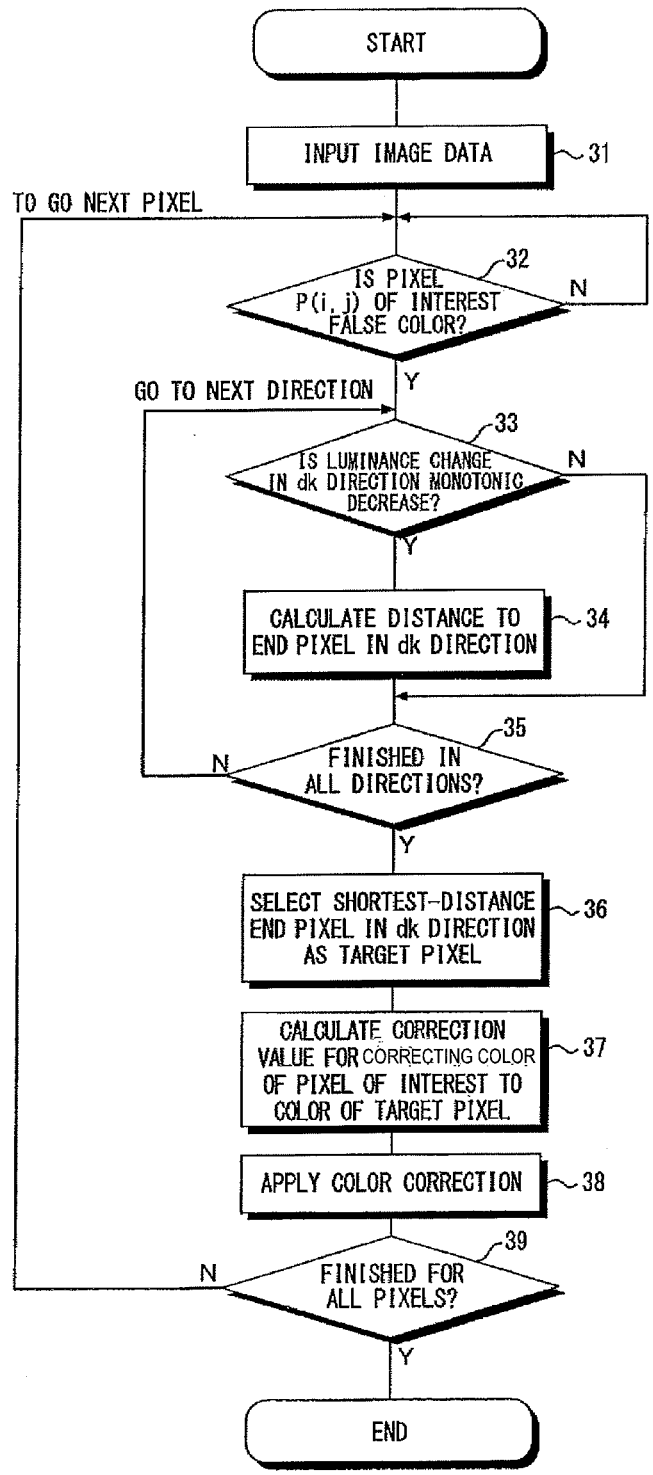
FIG. 4 is a flowchart illustrating false color correction processing according to a first embodiment of the present invention.

FIG. 4 is a flowchart illustrating color bleed correction processing executed in this image processing apparatus.

Image data to be processed is input from the image input unit 2 (step 31). The image data may be any of individual pixel signals (data) represented by RGB data, individual pixel signals (data) represented by YCrCb data or individual pixel signals (data) represented by Lab data. Even if the image data that has been input is RGB data, this data can be converted to YCrCb data or Lab data by the CPU 1.

Color bleed correction processing is executed for every pixel constituting the image represented by the image data to be processed. In the description that follows, let a pixel that undergoes processing be a pixel $P(i,j)$ of interest.

It is determined by the false color determination circuit 6 whether the pixel $P(i,j)$ of interest has a false color (step 32). Assume a case where the color purple is dealt with as a false color. Let each pixel be represented by R, G, B of eight bits each (0 to 255). If the condition $G<R$ and $G<B$ and $|B-R|<60$, for example, is satisfied, then it is determined that the pixel P(i,j) of interest has a false color that is purple.

If it is determined that the pixel P(i,j) of interest does not have a false color, then this pixel P(i,j) of interest is not subjected to color bleed correction processing and control proceeds to processing regarding the next pixel ("NO" at step 32). A pixel adjacent in the row direction is adopted as a new pixel P(i,j) of interest. When processing regarding one row of pixels ends, a column shift is made and the pixel included in the next column is adopted as the pixel P(i,j) of interest.

If it is determined that the pixel P(i,j) of interest has a false color (the color purple) ("YES" at step 32), the luminance direction determination circuit 7 investigates a change in luminance (a change in intensity) in a plurality of directions using the pixel P(i,j) of interest as the reference (center) and judges whether the change in luminance is indicating a monotonic decrease (step 33).

Figure 5:
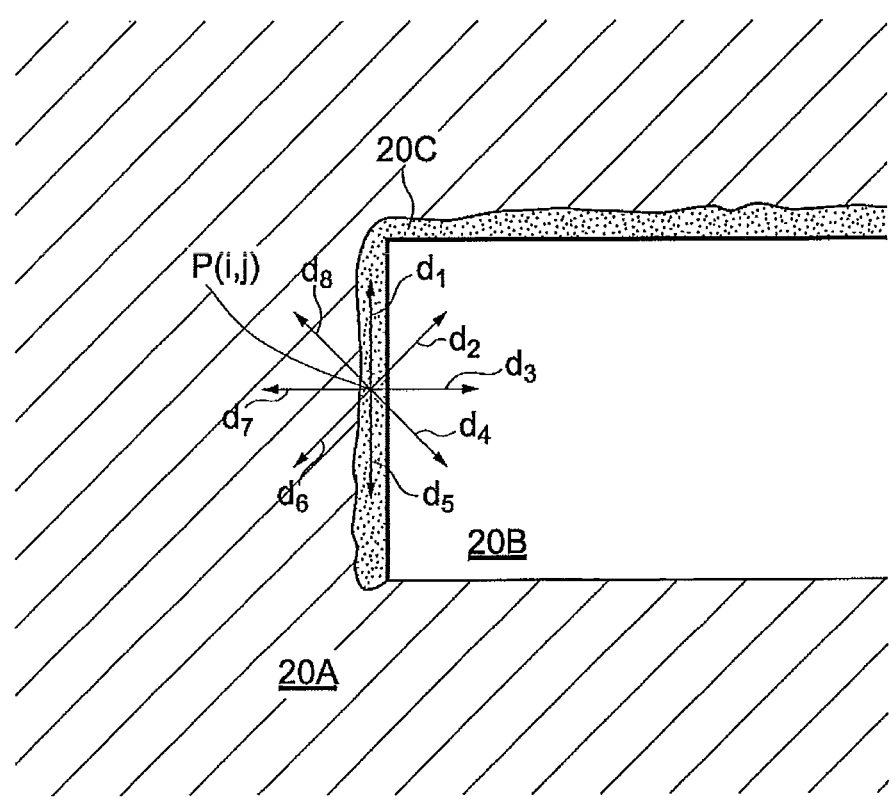
FIG. 5 illustrates a part of the image of FIG. 1 in enlarged form.

FIG. 5 illustrates an enlargement of the zone indicated by II in image 20 shown in FIG. 1.

A change in luminance in a plurality of directions occurs in the up and down directions (d1 direction and d5 direction), the right and left directions (d3 direction and d7 direction), right-diagonal directions (d2 direction and d6 direction) and left-diagonal directions (d4 direction and d8 direction) with the pixel P(i,j) of interest serving as the reference, by way of example.

The determination as to whether or not a change in luminance is a monotonic decrease is performed using one pixel or a plurality of successive pixels situated in each of the above-mentioned eight directions (two directions per each of the up and down directions, right and left directions, right-diagonal directions and left-diagonal directions, for a total of eight directions) from the pixel P(i,j) of interest.

Figure 6:
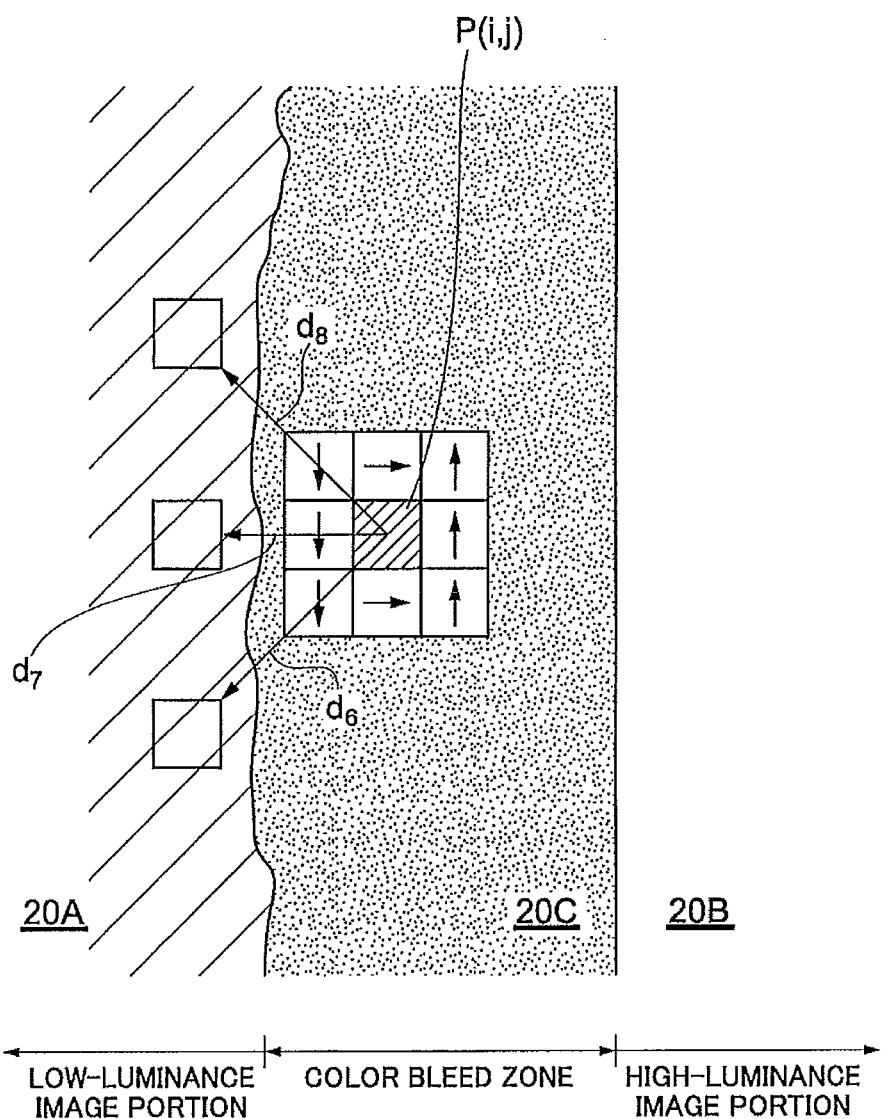
FIG. 6 illustrates the image portion of FIG. 5 in further enlarged form.

FIG. 6 illustrates a further enlarged view of the image portion shown in FIG. 5. With regard to each pixel adjacent to the pixel P(i,j) of interest in FIG. 6, a pixel whose luminance is greater than that of the pixel P(i,j) of interest is indicated by an up arrow, and a pixel whose luminance is less than that of the pixel P(i,j) of interest is indicated by a down arrow. A horizontal arrow indicates that the pixel has a luminance identical with that of the pixel P(i,j) of interest or has a luminance that is only slightly different.

With the pixel P(i,j) of interest as the reference, there is no change in luminance in the up direction (the d1 direction in FIG. 5). It is judged that the change in luminance in the up direction is not monotonically decreasing ("NO" at step 33). Control proceeds to processing regarding the upper-right direction (the d2 direction in FIG. 5) ("NO" at step 35; step 33).

The change in luminance is not a monotonic decrease in the upper-right direction (d2 direction), right direction (d3 direction), lower-right direction (d4 direction) and down direction (d5 direction) in FIG. 6. Control proceeds to the lower-left direction (d6 direction) ("NO" at step 35; step 33).

It is judged that the luminance of the pixel in lower-left direction (d6 direction) is less than that of the pixel P(i,j) of interest and that it is monotonically decreasing. Similarly, it is judged that the left direction (d7 direction) and upper-left direction (d8 direction) are directions of monotonic decrease. Control proceeds to the next step of processing regarding the following three directions: the lower-left direction (d6 direction), left direction (d7 direction) and upper-left direction (d8 direction) ("YES" at step 33).

A pixel where the monotonic decrease in luminance ends (a pixel where the false color ends) is found by the target pixel deciding circuit 8 with regard to each of the directions of monotonic decrease, and the distance from the pixel P(i,j) of interest to each of these "end" pixels is calculated (step 34).

Figure 7:
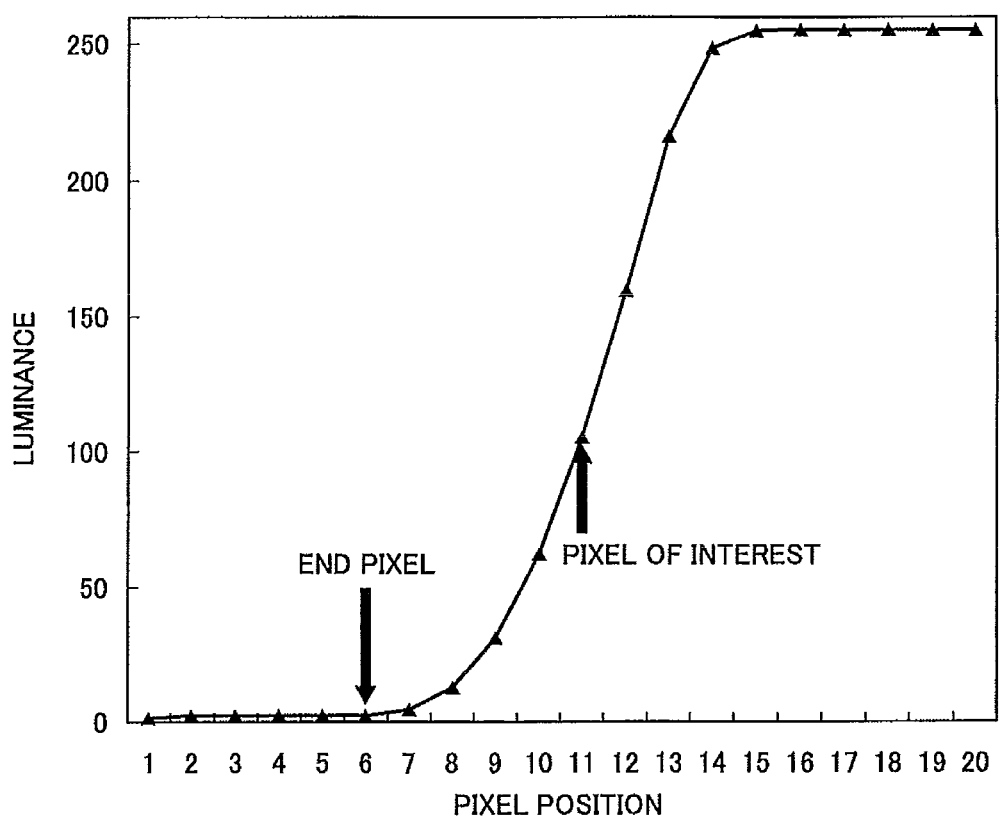
FIG. 7 is a graph representing luminance of a plurality of pixels, inclusive of a pixel of interest, arranged on a straight line along a direction of monotonic decrease.

FIG. 7 is a graph representing luminance of a plurality of pixels, inclusive of the pixel P(i,j) of interest, arranged on a straight line along a direction of monotonic decrease.

As described above, a purple fringe appears at the boundary (image edge) between a high-luminance image portion and a low-luminance edge portion. Accordingly, if luminance is calculated one pixel at a time in the direction of monotonic decrease from the pixel P(i,j) of interest where purple fringe has occurred (which has the purple false color), then a pixel representing the low-luminance image portion will be reached. The pixel reached first in the low-luminance image portion is dealt with as an end pixel.

In the image 20 shown in FIG. 6, the three directions [the lower-left direction (d6 direction), left direction (d7 direction) and upper-left direction (d8 direction)] with respect to the pixel P(i,j) of interest are directions of monotonic decrease in luminance. Accordingly, an end pixel is found with regard to each of these three directions and three distances, namely distances from the pixel P(i,j) of interest to the three end pixels, are obtained.

When the determination (step 33) regarding direction of monotonic decrease in all directions and the calculation (step 34) of distances up to end pixel in a case where the direction is the direction of monotonic decrease finish ("YES" at step 35), the end pixel having the shortest distance to the pixel P(i,j) of interest is selected as a target pixel (step 36). In the image 20 shown in FIG. 6, the end pixel found in the direction of monotonic decrease that is the left direction (d7) is adopted as the target pixel.

Next, the correction value calculating circuit 9 calculates a correction value (correction coefficient) for making the color of the pixel P(i,j) of interest the color of the target pixel that has been decided (step 37), and the correction processing circuit 10 corrects the color of the pixel P(i,j) of interest using the correction value decided (step 38). Since only color is corrected, the color correction is carried out using YCrCb data or Lab data in which luminance and color can be controlled separately. For example, if YCrCb data is used, the difference between the CrCb data of the pixel P(i,j) of interest and the CrCb data of the target pixel is used as the correction value and the correction value is added to the CrCb data of the pixel P(i,j) of interest, whereby the color of the pixel P(i,j) of interest is corrected to the color of the decided target pixel.

The above-described processing is applied to all pixels of the image to be processed ("NO" at step 39). When the processing of all pixels is completed, image correction processing ends ("YES" at step 39).

Thus, the color of a pixel where color bleed (false color or purple fringe) has occurred is corrected to the color of a nearby object or the background color that is free of color bleed. Color bleed can be eliminated and a change in the image edge portion after the correction can be corrected to a natural color.

In the foregoing embodiment, processing for correcting color bleed is executed by the false color determination circuit 6, luminance direction determination circuit 7, target pixel deciding circuit 8, correction value calculating circuit 9 and correction processing circuit 10. However, the CPU 1 can be made to execute the color bleed correction. In this case, a program that causes the CPU 1 to execute the color bleed correction is stored in the memory 4. This will hold true in the embodiments described below as well.

Second Embodiment

Figure 8:
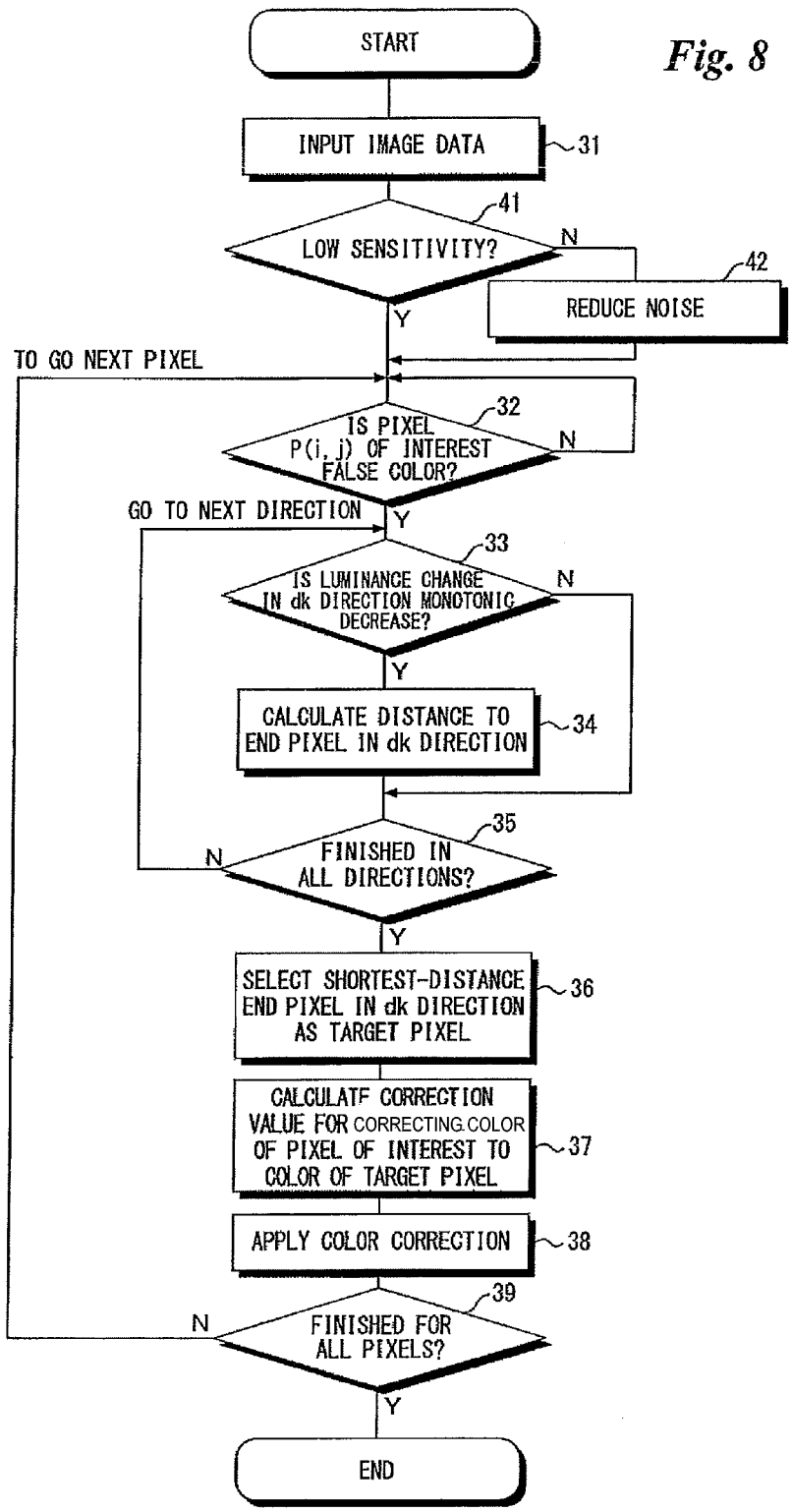
FIG. 8 is a flowchart illustrating false color correction processing according to a second embodiment of the present invention.

FIG. 8 is a flowchart illustrating color bleed correction processing according to a second embodiment of the present invention. This flowchart differs from the flowchart of the first embodiment shown in FIG. 4 in that noise reduction processing is executed beforehand in a case where the image data to be processed is image data obtained by high-sensitivity imaging (steps 41, 42). Processing steps in FIG. 8 identical with those of the flowchart of the first embodiment are designated by like step numbers and need not be described again. The image processing apparatus of the second embodiment also is basically implemented by hardware devices identical with those of the image processing apparatus (see FIG. 3) of the first embodiment.

In a case where the edge portion of an image represented by image data to be processed contains noise, particularly noise greater than an amount of change in the strength (luminance) of the edge portion (i.e., greater than the amount of change in signal quantity), there is a possibility that an error will occur in the determination of the direction of monotonic decrease in luminance. In particular, in a case where image data obtained by high-sensitivity imaging is image data to be processed, there is a high likelihood that the image data will contain a large amount of noise. In the correction processing according to the second embodiment, therefore, if the image data to be processed is not low-sensitivity data (i.e., is high-sensitivity data), then noise reduction processing using a low-pass filter or the like is executed beforehand by the luminance direction determination circuit 7 (steps 41, 42). Even if the image data is image data containing noise, the direction of monotonic decrease can be determined accurately and, as a result, color bleed can be corrected accurately.

The judgment (step 41) as to whether image data to be processed is low-sensitivity data or high-sensitivity data is rendered based upon ISO sensitivity or the like in exif data appended to the image data.

Third Embodiment

Figure 9:
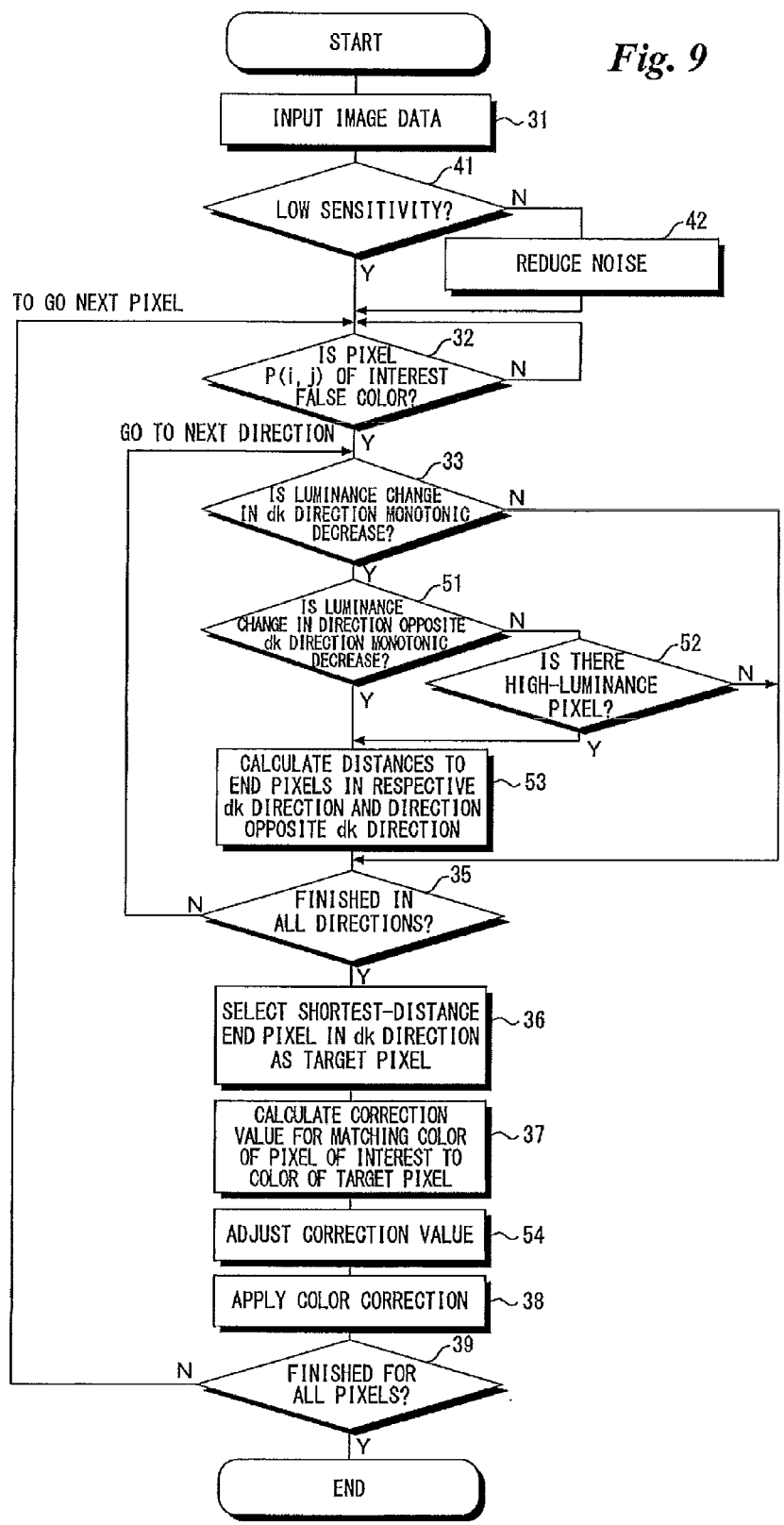
FIG. 9 is a flowchart illustrating false color correction processing according to a third embodiment of the present invention.

FIG. 9 is a flowchart illustrating color bleed correction processing according to a third embodiment of the present invention. This flowchart differs from the flowchart of the second embodiment shown in FIG. 8 in that: a change in luminance is investigated not only in the direction in which luminance decreases monotonically but also in the opposite direction (step 51); whether a pixel is a high-luminance pixel is investigated (step 52); and the calculated correction value is adjusted (step 54). Processing steps in FIG. 9 identical with those of the flowchart of the first embodiment (FIG. 8) are designated by like step numbers and need not be described again.

If it is determined that the pixel P(i,j) of interest has a false color (purple) ("YES" at step 32), a change in luminance in a plurality of directions is investigated using the pixel P(i,j) of interest as a reference (the center), and it is determined whether a change is a monotonic decrease (step 33), as described above. If a monotonic decrease in luminance is determined in a certain direction, then a change in luminance in the direction opposite this direction also is investigated and whether this change indicates a monotonic increase is determined (step 51). For example, if a monotonic decrease in luminance is determined with regard to the lower-left direction (d6 direction) shown in FIG. 5, then whether luminance is monotonically increasing is determined with regard to the upper-right direction (d2 direction).

Figure 10:
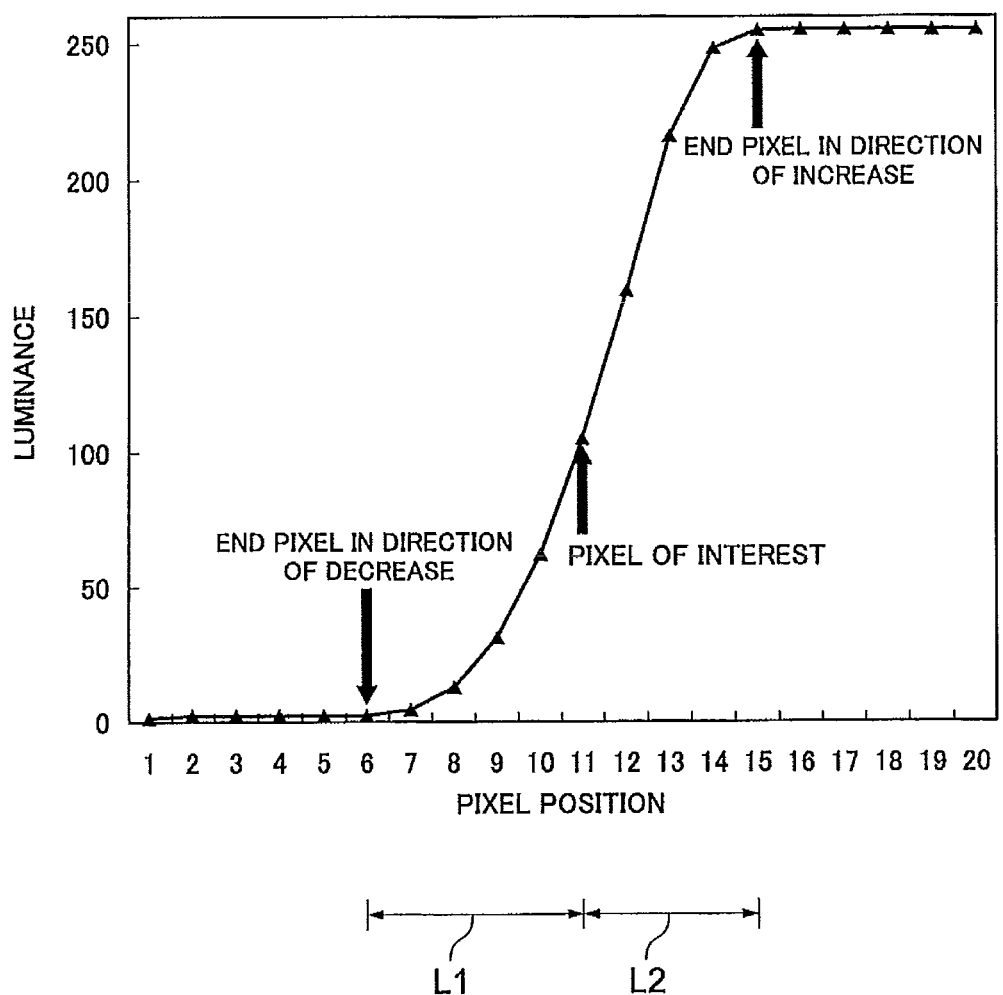
FIG. 10 is a graph representing luminance of a plurality of pixels, inclusive of a pixel of interest, arranged on a straight line along a direction of monotonic decrease and a direction of monotonic increase.

FIG. 10 is a graph representing luminance of a plurality of pixels, inclusive of the pixel P(i,j) of interest, arranged on a straight line along a direction of monotonic decrease and a direction of monotonic increase.

If a direction in which luminance is monotonically decreasing is found with the pixel P(i,j) of interest exhibiting the false color serving as the reference, then the luminances of pixels situated in the direction opposite this direction of monotonic decrease from the pixel P(i,j) of interest are detected. It is then determined whether luminance is monotonically increasing in the direction opposite the direction of monotonic decrease (step 51).

In the graph shown in FIG. 10, luminance is monotonically decreasing in one direction from the pixel P(i,j) of interest and is monotonically increasing in the opposite direction. In this case, luminance is calculated one pixel at a time from the pixel P(i,j) of interest along the one direction (the direction of monotonic decrease) and the pixel where the monotonic decrease ends (referred to as a "decrease-direction end pixel") is detected. Furthermore, luminance is calculated one pixel at a time from the pixel P(i,j) of interest also along the opposite direction (the direction of monotonic increase) relative to the one direction (the direction of monotonic decrease) and the pixel where the monotonic increase ends (referred to as an "increase-direction end pixel") is detected.

With regard to the direction of monotonic decrease and the direction of monotonic increase, the target pixel deciding circuit 8 calculates the distance from the pixel P(i,j) of interest to the decrease-direction end pixel and the distance from the pixel P(i,j) of interest to the increase-direction end pixel (step 53).

FIG. 11 also is a graph representing luminance of a plurality of pixels, inclusive of the pixel P(i,j) of interest, arranged on a straight line along a direction of monotonic decrease and a direction of monotonic increase.

The graph of FIG. 11 differs from that of FIG. 10 in that the luminance of the pixel P(i,j) of interest is high in FIG. 11. In this case, if a plurality of pixels are used in judging whether luminance is monotonically increasing, there are instances where it will be judged that the change is not a monotonic increase.

In a case where it is judged that luminance is monotonically decreasing in the one direction (dk direction) but is not monotonically increasing in the opposite direction (the direction opposite the dk direction) ("NO" at step 51), then it is judged whether a high-luminance pixel [a pixel having a luminance higher than that of the pixel P(i,j) of interest] exists in the opposition direction (step 52). In a case also where a high-luminance pixel is judged to exist, the target pixel deciding circuit 8 calculates the distance from the pixel P(i,j) of interest to the decrease-direction end pixel and the distance from the pixel P(i,j) of interest to the high-luminance pixel (step 53).

On the other hand, in a case where luminance is not monotonically increasing ("NO" at step 33), and in a case where luminance in the one direction is monotonically decreasing but luminance is not monotonically increasing in the direction opposite the one direction and, further, there is no high-luminance pixel in the opposite direction ("NO" at step 52), the detections of the end pixels in this directions (the decrease-direction end pixel and the increase-direction end pixel) and the distance calculations are skipped.

In a case where a set of distances from the pixel P(i,j) of interest to the decrease-direction end pixel and distances from the pixel P(i,j) of interest to the increase-direction end pixel (or high-luminance pixel) has been calculated with regard to a plurality of directions, the decrease-direction end pixel for which the distance to the pixel P(i,j) of interest is shortest is selected as the target pixel (step 36). The correction value calculating circuit 9 calculates a correction value (correction coefficient) for making the color of the pixel P(i,j) of interest match the color of the target pixel that has been decided (step 37).

An adjustment of the calculated correction value is performed using the distance from the pixel P(i,j) of interest to the decrease-direction end pixel and the distance from the pixel P(i,j) of interest to the increase-direction end pixel (or the high-luminance pixel) (step 54).

With reference again to FIGS. 10 and 11, if we let $L_1$ represent the distance from the pixel P(i,j) of interest to the decrease-direction end pixel and let $L_2$ represent the distance from the pixel P(i,j) of interest to the increase-direction end pixel (or the high-luminance pixel), the correction value after adjustment is calculated according to the following equation:

correction value after adjustment=correction value×
$L_1/(L_1+L_2)$                    Eq. (1)

The closer the pixel P(i,j) of interest is to the high-luminance image side, the more the corrected value after adjustment obtained by Equation (1) strengthens the correcting effect of the correction value. That is, with reference to FIG. 11, in a case where the pixel P(i,j) of interest is close to the high-luminance image portion, the value of $[L_1/(L_1+L_2)]$ increases and, hence, the correcting effect is strengthened (the correction value before adjustment is approached). Conversely, if the pixel P(i,j) of interest is close to the low-luminance image portion, the value of $[L_1/(L_1+L_2)]$ decreases and, hence, the correcting effect is weakened.

The color of the pixel P(i,j) of interest is corrected by the correction value after adjustment [Equation (1)] (step 38).

Color bleed, particularly purple fringing, readily occurs at an edge portion of an image where there is a large difference in luminance, and the portion where purple fringing occurs resides between a high-luminance image portion and a low-luminance image portion (see FIG. 1). By detecting not only the direction of luminance decrease but also whether luminance is increasing in the direction opposite this direction, or whether a high-luminance pixel exists in this opposite direction, the target pixel that is to undergo a color correction can be decided appropriately and erroneous correction is prevented.

The closer a purple fringe is to the high-luminance image portion, the more conspicuous the color purple becomes. The closer a purple fringe is to the low-luminance image portion, the less conspicuous the color purple becomes. By strengthening the correcting effect with regard to a pixel having a false color (purple fringe) that exists at a position near the high-luminance image portion and, conversely, weakening the correcting effect with regard to a pixel having a false color (purple fringe) that exists at a position near the low-luminance image portion, the entire region where purple fringing has occurred can be color-corrected smoothly.

The adjustment of the correction value need not necessarily use Equation (1) cited above as a matter of course. For example, it is permissible to adopt an arrangement in which the distance $L_1$ from the pixel P(i,j) of interest to the decrease-direction end pixel and the distance $L_2$ from the pixel P(i,j) of interest to the increase-direction end pixel (or high-luminance pixel) are compared, and two adjustment coefficients are used, namely one adjustment coefficient in a case where $L_1>L_2$ holds and another adjustment coefficient in a case where $L_1 \leq L_2$ holds. In any case, the correction value after adjustment would strengthen the correcting effect with regard to a pixel having a false color (purple fringe) that exists at a position near the high-luminance image portion and, conversely, would weaken the correcting effect with regard to a pixel having a false color (purple fringe) that exists at a position near the low-luminance image portion.

Modification of Third Embodiment

Figure 12:
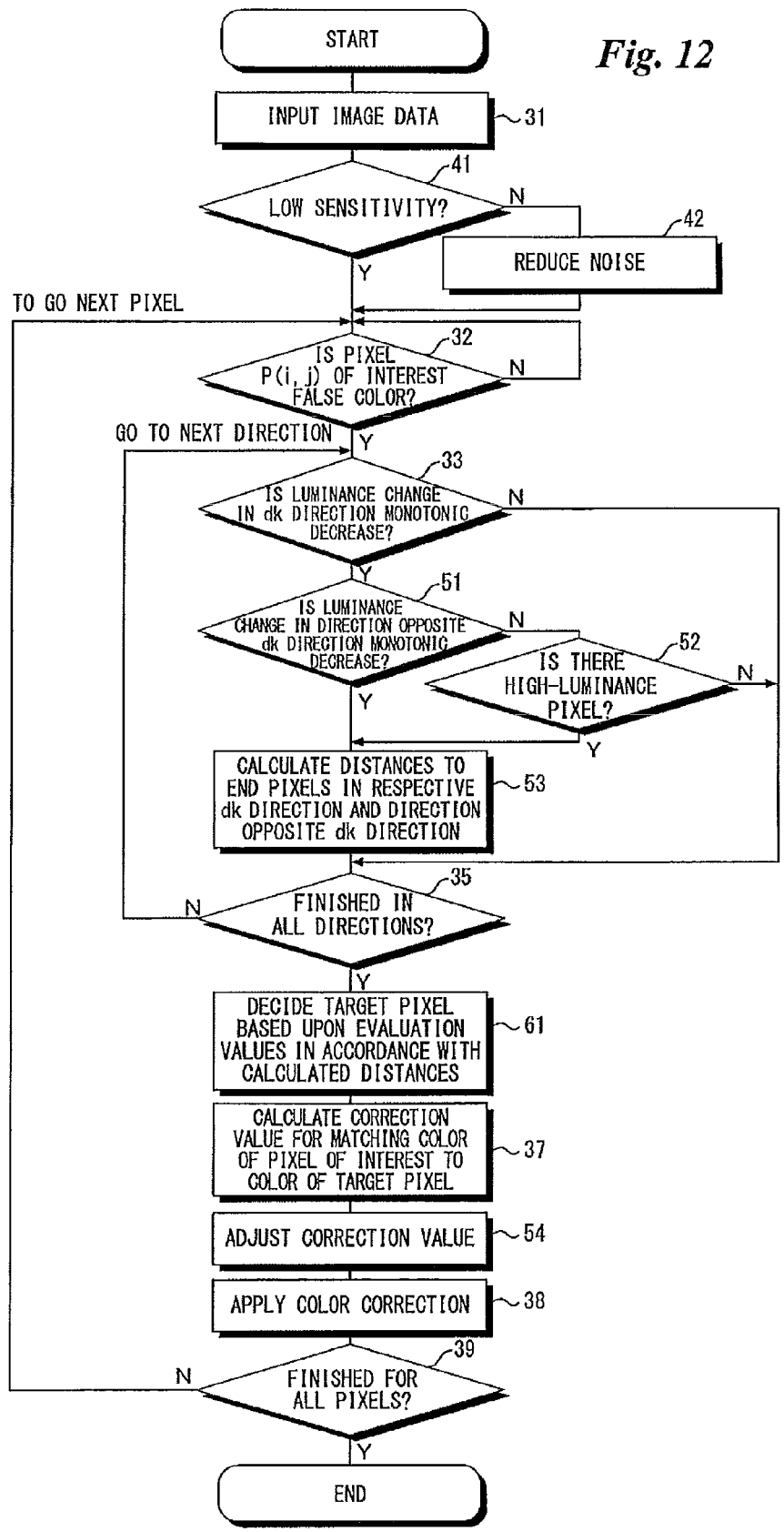
FIG. 12 is a flowchart illustrating false color correction processing according to a modification of the third embodiment.

FIG. 12 is a flowchart illustrating color bleed correction processing according to a modification of the third embodiment. Processing for selecting (deciding) the target pixel differs from that of the flowchart of the third embodiment shown in FIG. 9.

The third embodiment described above is such that if sets of a decrease-direction end pixel and increase-direction end pixel or high-luminance pixel have been found with regard to a plurality of directions, the decrease-direction end pixel having the shortest distance to the pixel P(i,j) of interest is selected as the target pixel (step 36). In a modification of the third embodiment, evaluation values are given for respective ones of the distances from the pixel P(i,j) of interest to the decrease-direction end pixels, distances from the pixel P(i,j) of interest to the increase-direction end pixels and distances from the pixel P(i,j) of interest to the high-luminance pixels, and the target pixel is selected (decided) in accordance with the set for which the total of the evaluation values is largest (step 61).

FIGS. 13A, B and C illustrate examples of calculation of the above-mentioned evaluation values and total evaluation values.

For example, assume that an evaluation value is two points if the distance to a decrease-direction end pixel and the distance to an increase-direction end pixel is less than 8 pel, one point if the distance is greater than 8 pel and less than 16 pel, and zero points if the distance is greater than 16 pel. Assume that the evaluation value is one point if the distance to the high-luminance pixel is less than 2 pel and zero points if the distance is greater than 2 pel.

With reference to FIG. 13A, assume that a direction of monotonic decrease in luminance lies along the leftward direction from the pixel P(i,j) of interest and that the distance from the pixel P(i,j) of interest to the decrease-direction end pixel is 3 pel. Furthermore, assume that luminance is monotonically increasing in the rightward direction, which is the opposite direction, and that the distance from the pixel P(i,j) of interest to the increase-direction end pixel is 5 pel. In this case, the evaluation value corresponding to the distance of 3 pel from the pixel P(i,j) of interest to the decrease-direction end pixel is two points, the evaluation value corresponding to the distance of 5 pel from the pixel P(i,j) of interest to the increase-direction end pixel is two points, and the total evaluation value is four points.

With reference to FIG. 13B, assume that a direction of monotonic decrease in luminance lies along the upper-left direction from the pixel P(i,j) of interest and that the distance from the pixel P(i,j) of interest to the decrease-direction end pixel is 6 pel. Furthermore, assume that luminance is not monotonically increasing but that a high-luminance pixel exists in the lower-right direction, which is the opposite direction, and that the distance from the pixel P(i,j) of interest to the high-luminance pixel is 1 pel. In this case, the evaluation value corresponding to the distance of 6 pel from the pixel P(i,j) of interest to the decrease-direction end pixel is two points, the evaluation value corresponding to the distance of 1 pel from the pixel P(i,j) of interest to the high-luminance pixel is one point, and the total evaluation value is three points.

With reference to FIG. 13C, assume that a direction of monotonic decrease in luminance lies along the lower-left direction from the pixel P(i,j) of interest and that the distance from the pixel P(i,j) of interest to the decrease-direction end pixel is 9 pel. Furthermore, assume that luminance is monotonically increasing in the upper-right direction, which is the opposite direction, and that the distance from the pixel P(i,j) of interest to the increase-direction end pixel is 2 pel. In this case, the evaluation value corresponding to the distance of 9 pel from the pixel P(i,j) of interest to the decrease-direction end pixel is one point, the evaluation value corresponding to the distance of 2 pel from the pixel P(i,j) of interest to the decrease-direction end pixel is two points, and the total evaluation value is three points.

In the case of the examples of FIGS. 13A, B and C, the decrease-direction end pixel that exists in the direction of FIG. 13A for which the total evaluation value is largest, namely the leftward direction from the pixel P(i,j) of interest, is selected (decided) as the target pixel (step 61).

Color bleed readily occurs in the vicinity of a high-luminance pixel and the zone of color bleed is about 8 pel. By selecting a target pixel in accordance with the total evaluation value that is largest, it is possible to reduce erroneous discrimination in a case where a subject image such as a point light source is present.

Fourth Embodiment

Figure 14:
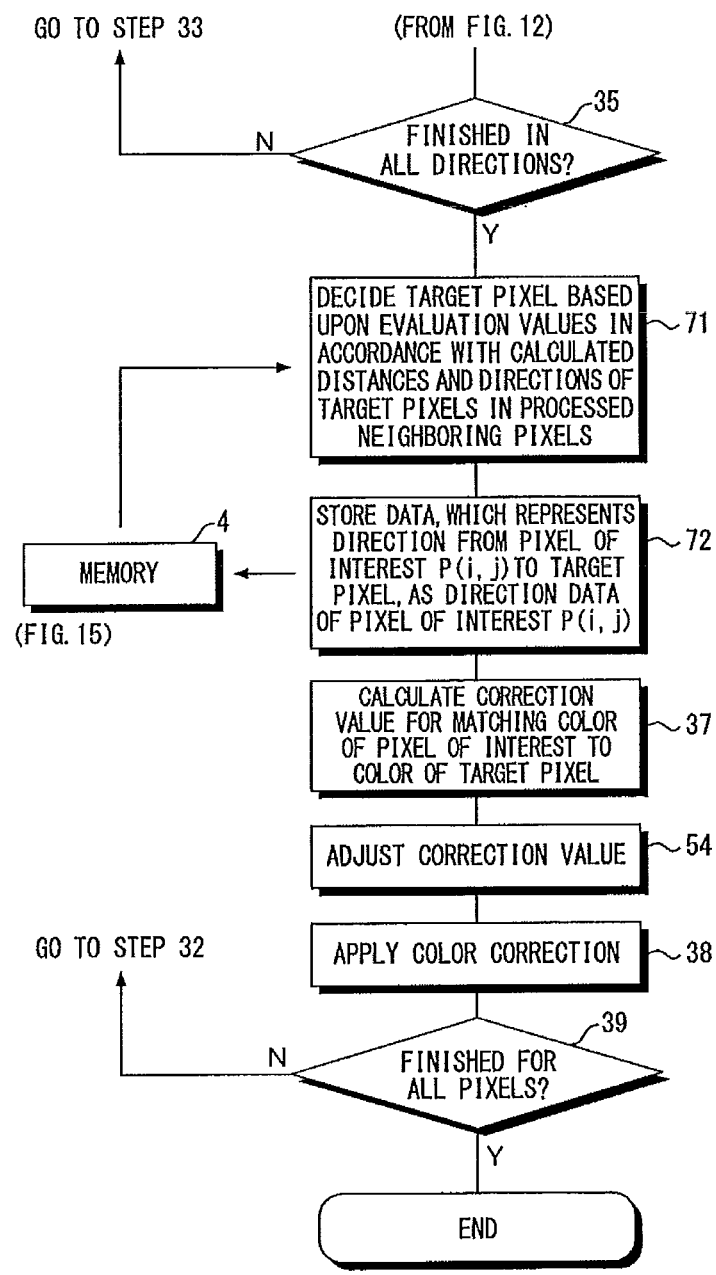
FIG. 14 is a flowchart illustrating false color correction processing according to a fourth embodiment of the present invention.

FIG. 14 is a flowchart illustrating false color (purple fringe) correction processing according to a fourth embodiment of the present invention. Processing preceding step 35 in the flowchart of FIG. 14 is the same as that of the flowchart shown in FIG. 12. The flowchart of FIG. 14 differs from the flowchart of the modification of the third embodiment shown in FIG. 12 in that information concerning processed pixels that have already undergone false color (purple fringe) correction processing is used in deciding the target pixel at the pixel P(i,j) of interest (steps 71, 72).

Figure 15:
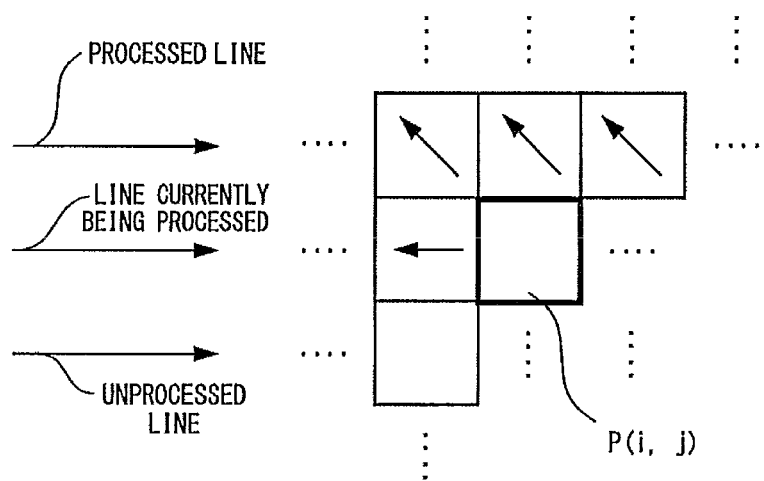
FIG. 15 illustrates an enlargement of a portion of an image currently undergoing false color correction processing.

FIG. 15 illustrates an enlargement of a portion of an image currently undergoing false color (purple fringe) correction processing.

In the modification of the third embodiment, a decrease-direction end pixel in a direction of monotonic decrease in luminance is detected in a case where the opposite direction is a direction of monotonic increase in luminance or where a high-luminance pixel exists in the opposite direction (steps 33, 51, 52, 53). In a case where a plurality of directions of monotonic decrease in luminance have been detected, the target pixel is decided in accordance with that direction for which the total evaluation value is largest (see step 61 in FIG. 12 and FIGS. 13A to C). However, in a case where the image data contains noise, there are instances where an erroneous determination is made in determining the direction of monotonic decrease in luminance, as described earlier. In order to reduce the effects of occurrence of erroneous determination, the fourth embodiment is such that the direction of the target pixel decided in the processed pixels [the direction from the pixel P(i,j) of interest toward the target pixel] is used in deciding the target pixel with regard to the pixel P(i,j) of interest.

With reference to FIG. 15, the pixel P(i,j) of interest is scanned one pixel at a time in the horizontal direction and, when scanning of one line ends, scanning is shifted one line in the vertical direction and the next line is scanned. Accordingly, with regard to four adjoining pixels (referred to as "processed neighboring pixels" below) adjacent in the upper-left direction, upward direction, upper-right direction and leftward direction of the pixel P(i,j) of interest, target pixels have already been decided, and the directions from the pixel of interest in the target direction (the directions of the target pixels) have already been decided. The fourth embodiment is such that when a target pixel is decided, data relating to the direction toward the target pixel is stored in the memory 4 (step 72 in FIG. 14). In FIG. 15, the directions of target pixels already decided with regard to the processed neighboring pixels are indicated by the arrows.

The fourth embodiment is such that in a case where there are a plurality of directions of monotonic decrease in luminance in which the opposite direction is a direction of monotonic increase in luminance or a high-luminance pixel exists in the opposite direction, the target pixel is selected (decided) in accordance with the above-described evaluation values and evaluation values based upon the directions of the target pixels of the processed neighboring pixels (step 71).

FIGS. 16A, B and C illustrate examples of calculation of total evaluation values using the evaluation values described in the modification of the third embodiment and an evaluation value based upon the directions of target pixels of processed neighboring pixels.

For example, an evaluation value of two points is added with regard to a direction having the highest frequency of appearance among directions of target pixels already decided in the processed neighboring pixels. In the case of the examples shown in FIG. 15, the direction of the target pixels in the processed neighboring pixels for which the frequency of appearance is highest is the upper-left direction. Accordingly, the evaluation value of two points is added with regard to the set for which the upper-left direction is the direction of monotonic decrease in luminance.

With reference to FIGS. 16A to C, the upper-left direction is assumed as a direction of monotonic decrease in luminance in FIG. 16B. With regard to FIG. 16B, therefore, an evaluation value of two points based upon the directions of the target pixels of the processed neighboring pixels is added. In the case of the examples of FIGS. 16A to C, the decrease-direction end pixel that exists in the direction in FIG. 16B for which the total evaluation value is largest, namely the upper-left direction from the pixel P(i,j) of interest, is selected (decided) as the target pixel (step 71).

When a target pixel is decided with regard to the pixel P(i,j) of interest, the data representing the direction of the target pixel decided with regard to this pixel P(i,j) of interest is stored in the memory anew (see FIG. 15).

Thus a target pixel to which the color of the pixel P(i,j) of interest is to be made to conform is decided upon taking into account a change in direction in the surroundings. Accordingly, even if erroneous detection occurs in the determination of the direction of monotonic decrease in luminance owing to noise or the like, an appropriate target pixel can be decided. As a result, color bleed can be corrected for more accurately.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
an image input device for accepting input of applied image data;
a color bleed determining device for determining whether a pixel of interest in the image data exhibits color bleed;
a luminance monotonic decrease direction discriminating device for discriminating, in a case where said color bleed determining device has determined that the pixel of interest exhibits color bleed, a direction in which luminance is monotonically decreasing, using the pixel of interest as a starting point, in the neighborhood of the pixel of interest;

a luminance monotonic decrease end pixel search device for finding a pixel, at which the monotonic decrease in luminance ends, in the direction in which luminance is monotonically decreasing discriminated by said luminance monotonic decrease direction discriminating device;

a target pixel deciding device for deciding upon the luminance monotonic decrease end pixel, which has been found by said luminance monotonic decrease end pixel search device, as a target pixel;

a color correction value calculating device for calculating a correction value that corrects color of the pixel of interest to the color of the target pixel decided by said target pixel deciding device a color correcting device for correcting the color of the pixel of interest using the color correction value calculated by said color correction value calculating device; and a distance calculating device for calculating, in a case where a plurality of directions of luminance monotonic decrease have been discriminated by said luminance monotonic decrease direction discriminating device, distances between the pixel of interest and a plurality of luminance monotonic decrease end pixels found in every direction of luminance monotonic decrease by said luminance monotonic decrease end pixel search device;

wherein said target pixel deciding device decides, in accordance with the distances calculated by said distance calculating device, that a luminance monotonic decrease end pixel closest to the pixel of interest is the target pixel from among the plurality of luminance monotonic decrease end pixels found by said luminance monotonic decrease end pixel search device.

2. The apparatus according to claim 1, further comprising a noise reducing device for subjecting the image data to noise reduction processing.

3. The apparatus according to claim 1, further comprising a luminance monotonic increase discriminating device for discriminating whether luminance is monotonically increasing, using the pixel of interest as a starting point, in an opposite direction relative to the direction in which luminance is monotonically decreasing discriminated by said luminance monotonic decrease direction discriminating device;

wherein in case where luminance has been discriminated to be monotonically increasing in the opposite direction by said luminance monotonic increase discriminating device, said luminance monotonic decrease end pixel search device finds a luminance monotonic decrease end pixel in the direction in which luminance is monotonically decreasing.

4. The apparatus according to claim 3, further comprising a high-luminance pixel detecting device for detecting, in a case where luminance is discriminated not to be monotonically increasing in the opposite direction by said luminance monotonic increase discriminating device, whether a high-luminance pixel having a luminance higher than that of the pixel of interest exists in the opposite direction;

wherein if, in a case where said high-luminance pixel detecting device has determined that a high-luminance pixel having a luminance higher than that of the pixel of interest exists in the opposite direction, luminance is discriminated not to be monotonically increasing in the opposite direction by said luminance monotonic increase discriminating device, then said luminance monotonic decrease end pixel search device finds a luminance monotonic decrease end pixel in the direction in which luminance is monotonically decreasing.

5. The apparatus according to claim 3, further comprising:
a luminance monotonic increase end pixel search device for finding a pixel, at which a monotonic increase in luminance ends, in the direction in which luminance is monotonically increasing; and a correction value adjusting device for adjusting the color correction value, which has been calculated by said color correction value calculating device, in accordance with distance from the pixel of interest to the luminance monotonic decrease end pixel and distance from the pixel of interest to the luminance monotonic increase end pixel;

wherein said color correcting device corrects the color of the pixel of interest using the color correction value adjusted by said correction value adjusting device.

6. The apparatus according to claim 4, further comprising a correction value adjusting device for adjusting the color correction value, which has been calculated by said color correction value calculating device, in accordance with distance from the pixel of interest to the luminance monotonic decrease end pixel and distance from the pixel of interest to the high-luminance pixel;

wherein said color correcting device corrects the color of the pixel of interest using the color correction value adjusted by the correction value adjusting device.

7. The apparatus according to claim 1, further comprising:
a luminance monotonic increase end pixel search device for finding a pixel, at which a monotonic increase in luminance ends, using the pixel of interest as a starting point, in an opposite direction relative to the direction in which luminance is monotonically decreasing discriminated by said luminance monotonic decrease direction discriminating device;

a high-luminance pixel search device for finding, in a case where luminance is not monotonically increasing in the opposite direction, a high-luminance pixel having a luminance higher than that of the pixel of interest in the opposite direction; and a distance calculating device which, in a case where a plurality of directions of luminance monotonic decrease have been discriminated by said luminance monotonic decrease direction discriminating device and, moreover, opposite directions relative to the plurality of directions of luminance monotonic decrease are directions of luminance monotonic increase, or high-luminance pixels exist in the opposite directions, is for calculating distances between the pixel of interest and a plurality of luminance monotonic decrease end pixels, and distances between the pixel of interest and a plurality of luminance monotonic increase end pixels or the high-luminance pixels;

wherein on the basis of evaluation values calculated in accordance with the distances between the pixel of interest and the luminance monotonic decrease end pixels and the distances between the pixel of interest and the luminance monotonic increase end pixels or the high-luminance pixels, which have been calculated by said distance calculating device, said target pixel deciding device decides, in accordance with a set, for which the evaluation value is largest, composed of a direction of luminance monotonic decrease and a direction of luminance monotonic increase or high-luminance pixel, upon a luminance monotonic decrease end pixel in this luminance monotonic decrease direction as the target pixel.

8. The apparatus according to claim 7, further comprising a direction data storage device for storing data, which represents a direction from the pixel of interest toward the target pixel decided by the target pixel deciding device, for every pixel of interest;
    wherein said target pixel deciding device adds an evaluation value, which is in accordance with data stored in said direction data storage device representing direction toward a target pixel regarding a processed pixel neighboring the pixel of interest, to the evaluation value calculated in accordance with said distances.

9. An image processing method comprising the steps of:
accepting input of applied image data;
determining whether a pixel of interest in the image data exhibits color bleed;
discriminating, in a case where it has been determined that the pixel of interest exhibits color bleed, a direction in which luminance is monotonically decreasing, using the pixel of interest as a starting point, in the neighborhood of the pixel of interest;
finding a pixel, at which the monotonic decrease in luminance ends, in the discriminated direction in which luminance is monotonically decreasing;
deciding upon the found luminance monotonic decrease end pixel as a target pixel;
calculating a correction value that corrects color of the pixel of interest to the color of the target pixel decided;
correcting the color of the pixel of interest using the color correction value calculated; and
calculating, in a case where a plurality of directions of luminance monotonic decrease have been discriminated by said luminance monotonic decrease direction discriminating step, distances between the pixel of interest and a plurality of luminance monotonic decrease end pixels found in every direction of luminance monotonic decrease by said luminance monotonic decrease end pixel finding step;
wherein said target pixel deciding step decides, in accordance with the distances calculated by said distance calculating step, that a luminance monotonic decrease end pixel closest to the pixel of interest is the target pixel from among the plurality of luminance monotonic decrease end pixels found by said luminance monotonic decrease end pixel finding step.

10. A non-transitory recording medium on which has been recorded a program for causing a computer to:
accept input of applied image data;
determine whether a pixel of interest in the image data exhibits color bleed;
discriminate, in a case where it has been determined that the pixel of interest exhibits color bleed, a direction in which luminance is monotonically decreasing, using the pixel of interest as a starting point, in the neighborhood of the pixel of interest;
find a pixel, at which the monotonic decrease in luminance ends, in the discriminated direction in which luminance is monotonically decreasing;
decide upon the found luminance monotonic decrease end pixel as a target pixel;
calculate a correction value that corrects color of the pixel of interest to the color of the target pixel decided;
correct the color of the pixel of interest using the color correction value calculated; and
calculate in a case where a plurality of directions of luminance monotonic decrease have been discriminated by said luminance monotonic decrease direction discriminating step, distances between the pixel of interest and a plurality of luminance monotonic decrease end pixels found in every direction of luminance monotonic decrease by said luminance monotonic decrease end pixel finding step;
wherein said target pixel deciding step decides, in accordance with the distances calculated by said distance calculating step, that a luminance monotonic decrease end pixel closest to the pixel of interest is the target pixel from among the plurality of luminance monotonic decrease end pixels found by said luminance monotonic decrease end pixel finding step.

\* \* \* \* \*